United States Patent
Eckert

(10) Patent No.: US 7,853,956 B2
(45) Date of Patent: Dec. 14, 2010

(54) MESSAGE SYSTEM AND METHOD

(75) Inventor: Robert W. Eckert, East Windsor, NJ (US)

(73) Assignee: International Business Machines Corporation, Armonk, NY (US)

( * ) Notice: Subject to any disclaimer, the term of this patent is extended or adjusted under 35 U.S.C. 154(b) by 1629 days.

(21) Appl. No.: 11/117,449

(22) Filed: Apr. 29, 2005

(65) Prior Publication Data

US 2006/0248536 A1 Nov. 2, 2006

(51) Int. Cl.
*G06F 3/00* (2006.01)

(52) U.S. Cl. ...................................... 719/314

(58) Field of Classification Search .............. 719/313, 719/314

See application file for complete search history.

(56) References Cited

U.S. PATENT DOCUMENTS

| | | | | |
|---|---|---|---|---|
| 5,617,570 | A * | 4/1997 | Russell et al. | 719/312 |
| 5,721,916 | A * | 2/1998 | Pardikar | 707/201 |
| 6,208,345 | B1 * | 3/2001 | Sheard et al. | 715/853 |
| 6,760,911 | B1 | 7/2004 | Ye | |
| 6,865,599 | B2 | 3/2005 | Zhang | |
| 7,039,671 | B2 * | 5/2006 | Cullen | 709/201 |
| 7,228,346 | B1 * | 6/2007 | Allavarpu et al. | 709/223 |
| 7,464,382 | B1 * | 12/2008 | Kushnirskiy | 719/314 |
| 7,634,777 | B2 * | 12/2009 | Dievendorff et al. | 719/315 |
| 2003/0065623 | A1 | 4/2003 | Corneil et al. | |
| 2003/0105887 | A1 | 6/2003 | Cox et al. | |
| 2004/0012630 | A1 | 1/2004 | Carels et al. | |
| 2004/0163091 | A1 | 8/2004 | Brill | |
| 2004/0177133 | A1 | 9/2004 | Harrison et al. | |
| 2004/0205136 | A1 | 10/2004 | Whittenberger et al. | |
| 2004/0249958 | A1 | 12/2004 | Ozdemir et al. | |
| 2005/0004975 | A1 | 1/2005 | Prasad | |
| 2005/0028167 | A1 | 2/2005 | Stall | |

OTHER PUBLICATIONS

Sung-Young Park, A High Performance Message-Passing System for Network of Workstations, 1995.*

* cited by examiner

*Primary Examiner*—Lechi Truong
(74) *Attorney, Agent, or Firm*—Anna Linne; Roberts Mlotkowski Safran & Cole, P.C.

(57) ABSTRACT

A method and system for bridging services is provided. The method and system includes retrieving at last one message from a first messaging tool using at least one processing thread to retrieve message objects from a messaging queue of the first messaging tool. This aspect of the invention further includes executing a preprocessing on the retrieved message object using a predefined application programming interface (API) and placing the preprocessed message on an API of a second messaging tool. A computer program product comprising a computer useable medium including a computer readable program which, when executed causes the computer to implement the steps of the method.

6 Claims, 3 Drawing Sheets

MESSAGE SYSTEM AND METHOD

FIELD OF THE INVENTION

The invention generally relates to a message system and, more particularly, to bridge services in a networked environment.

BACKGROUND DESCRIPTION

In the past, it was possible to deploy many different types of servers, which only needed to communicate with each other occasionally; however, in current implementations, many a business applications require systems to communicate in real or near real-time, automatically. Without a solution to communicate universally between such platforms in real or near real-time, there would be a need to design and implement a protocol on separate platforms, which is not a trivial form of programming. This would also lead to the requirement of extensive time and resources for developing and testing such low-level communications code.

MQ Series Messaging System is a message-oriented middleware for providing exchange of messages (and data on an enterprise wide basis. Currently, MQ Series is used extensively in many locations and is gaining the acceptance as the defacto cross platform messaging tool. MQ Series Messaging System is offered by many providers including Microsoft® and IBM MQ Series (Message Queuing Series).

Microsoft® BizTalk is gaining ground as an EDI (electronic data interchange) processing and work flow service BizTalk is a set of tools enabling business-to-business (B2B) exchange. In effect, BizTalk enables B2B eCommerce and process integration, the latter of which enables disparate business applications to exchange documents with each other over a network or enterprise system. The BizTalk Framework is an open framework for B2B exchange, which is implemented across major platforms and most major B2B products from other companies. BizTalk is built on the Microsoft® Windows® 2000 operating system.

Microsoft® has released an MQ Adapter for BizTalk, but it turns out not to be very practical solution. First, it requires a piece of code to run on the MQ Server, itself. This limits the MQ Server to run on Windows® based machines. This, in of itself, is a very limiting feature, especially in view of the advent of new systems such as, for example, Linux® based system. Second, the MQ Adapter for BizTalk uses a preprocessor extension API (application program interface) that is very difficult to understand and is actually not compatible with their flagship development environment, e.g., Microsoft.Net. This would appear to be contrary to the underlying advantages of an API, i.e., a set of routines, protocols, and tools for building software applications which makes it easier to develop a program by providing all the building blocks. The MQ configuration for the MS adapter is also overly complex, as it acts as a remote queue manager.

SUMMARY OF THE INVENTION

In a first aspect of the invention, a method includes retrieving at least one message from a first messaging tool using at least one processing thread to retrieve message objects from a messaging queue of the first messaging tool. This aspect of the invention further includes executing a preprocessing on the retrieved message object using a predefined application programming interface (API) and placing the preprocessed message on an API of a second messaging tool.

In another aspect of the invention, a method includes preprocessing messages as a set of loadable objects having access to a first messaging tool and accessing a second messaging tool interface. The method further includes creating a thread for loading a preprocessor object to process a message body incoming from the first messaging tool before passing the thread to the second messaging tool interface.

In yet another aspect of the invention, computer program product comprising a computer useable medium including a computer readable program has computer readable program that when executed on a computer causes the computer to preprocess messages as a set of loadable object having access to a first messaging tool and access a second messaging tool interface. The computer readable program, when executed, also causes the computer to create a listener thread for loading a preprocessor object to process a message body incoming from the first messaging tool before passing the listener thread to the second messaging tool interface.

In another aspect of the invention, a system includes an application programming interface for preprocessing messages as a set of loadable objects having access to a first messaging tool. The system further includes a module for accessing a second messaging tool interface and a service for creating at least one listener thread for loading a preprocessor object to process a message body incoming from the first messaging tool before passing the at least one listener thread to the second messaging tool interface.

DETAILED DESCRIPTION OF EMBODIMENTS OF THE INVENTION

The invention is directed to a system and method of message queuing and more particularly to providing a bridge service in a network environment The bridge service of the invention addresses the issues with, for example. MQ to BizTalk bridge service which utilizes the .Net MQ Client and BizTalk API directly. The invention is further applicable to any message queuing system such as, for example, java message service (JMS) or XIPC. As should be understood, JMS and XIPC are middleware products that manage interprocess communications across programs in a network.

Figure 1:
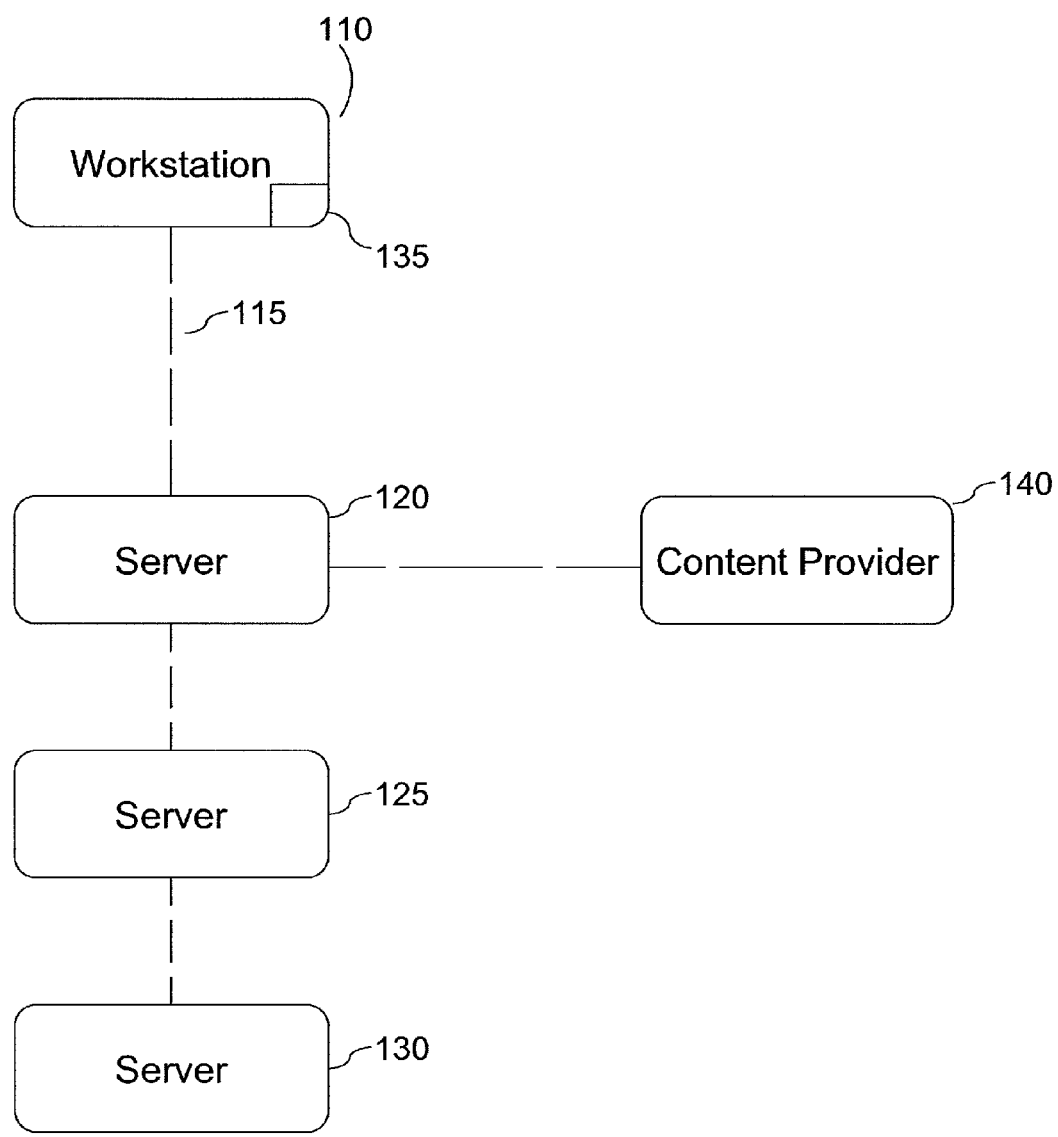
FIG. 1 is a block diagram of an embodiment of the invention.

FIG. 1 is a block diagram of an embodiment of the invention, generally denoted by reference numeral 100. The invention includes at least one user's workstation 110 (i.e., a client, a workstation, or client workstation) which typically has a memory device (for example, a hard drive DVD drive, or the like). The user workstation 110 may be connected via a network 115 (e.g., a local area network (LAN), a wide area network (WAN), wireless network, or the Internet) to a server 120. Also included may be at least one content provider 140 which may comprise one or more content providers, also connected via the network 115 to the server 120. The server 120 may optionally comprise a plurality of servers 125 and 130. For illustrative purposes, in one non-limiting example, the servers 120, 125 and 130 may each include different application programs, platforms, etc. For example, the server may include different content sources such as WebSphere, DB2 databases, local directory access protocol (LDAP), Web sites, or the like.

The configuration of the invention can be implemented in the environment of FIG. 1. For example, the invention can reside on the server 120, although, it is contemplated that the invention can reside on any of the components or run with any of the components of FIG. 1. The configuration of the invention allows the ability to preprocess messages with the .Net API, as a set of loadable objects. These loadable objects have full access to MQ data, including key fields such as Message ID and Correlation ID, in their native format.

A module (MQ AIC) 135 may be resident on the server (e.g., BizTalk server), for example, provided to submit message from BizTalk back to MQ, or across other platform. This module 135 exposes the AIC interface, and also has the ability to look up destination MQ Queue manager and destination Queue information based on document type, sender id or by a predefined destination. The AIC interface is an application interface component that allows BizTalk to communicate with other systems, for example. In one non-limiting embodiment, the MQ AIC application integration component transmits documents to an MQ Series Queue or Distribution List.

Figure 2:
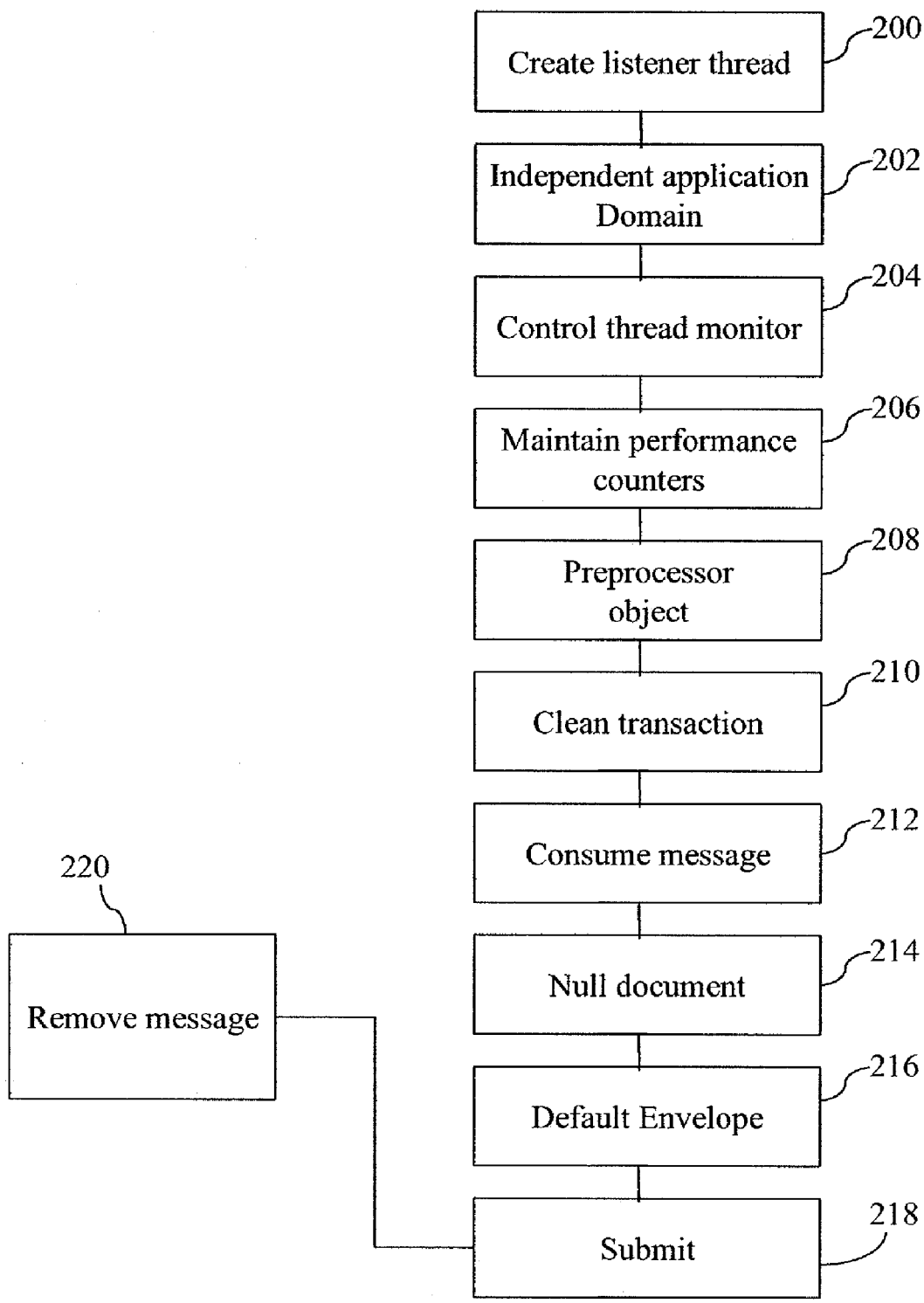
FIG. 2 is an embodiment of the invention showing steps of content categorization in accordance with the invention.

FIG. 2 is a block diagram of an embodiment of the invention. FIG. 2 (as well as other block or flow diagrams) may also be representative of flow or state diagrams of embodiments showing steps of the invention. The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution stem, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current example of optical disks include compact disk—read only memory (CDROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring to FIG. 2 the invention can be implemented by a .Net Windows service which creates a listener thread for each configured queue (block 200). The service is thus capable of creating a listener thread for loading a preprocessor object to process a message body in coming from a first messaging tool (e.g., MQ manager) before passing the listener thread to the second messaging tool interface (e.g., BizTalk). The .Net Windows service is implemented using the .Net Framework utilizing any .Net framework compatible programming language by deriving the service object from System.ServiceProcess.ServiceBase. This allows the process to run in the background without any user interaction, allowing this process to run automatically.

By utilizing background threads, multiple queues can be monitored and used simultaneously, and by utilizing multiple listeners on one queue, the performance can be fined tuned to match the needs of the system. Additionally, an independent application domain is created for each background thread to allow dynamic loading and unloading of individual preprocessor components without the need to restart the entire service (block 202). Thus, each listener thread executes under an independent application domain and exposes the application programming interface to allow the dynamic loading and unloading of individual components without the need to restart the service.

Each background thread which acts as a single flow of execution which is attached to a MQ queue can load a "PreProcessor" module independently of other threads. This allows for custom processing of the MQ Message received from the queue prior to submitting it to BizTalk. The utilization of the application domain concept in the .Net framework allows the "PreProcessors" to be updated and a new version loaded while the service is running. This allows "in flight" or real-time or near real-time bug fixes and feature enhancements to be deployed with out affecting the processing of other messages.

A control thread will monitor the status of the listener threads and restart them if necessary (block 204). This eliminates any user intervention if a problem exist. For example, by monitoring the status of the listener threads, it is possible to restart a listener thread if connectivity to the message server or BizTalk server is lost. The control thread maintains a copy of the configuration file, which specifies each queue to listen to, and the appropriate configuration setting for each queue. The configuration settings, within the configuration file, dictate the queues to listen to and what preprocessors apply to each queue.

Upon system startup, the controller, e.g., control thread, steps through the configuration settings and creates a "ListenerThread" object which represents an MQ Listener for each configured listener thread, and then applies the individual thread configurations' settings. Once this set of listener thread objects is created, a timer is treated to wake up the control thread at a preselected interval (e.g., 5 seconds), at which time the control thread steps through the list of listener threads and checks a status property.

If the listener thread's status property is not "running", then the control thread starts the listener thread by creating a new thread object which executes the Listener Thread's Process Message method. The control process records the thread id from the listener thread with the "ListenerThread" object for future reference. The control process can then find an independent thread and allow the control objects to stop a specific thread if required, for example, to stop the service. Thus, by having a separate control thread monitoring the status of the "Listener Threads"/MQ Listener, any errors or problems that exist on an individual listener thread (e.g., MQ Server connection lost, Bad Message, . . . ) are alleviated because the processing can be automatically restarted at any predetermined time period interval, e.g., every 5 seconds.

The controller, e.g., control thread, will also maintain performance counters which can be used by a monitoring program to determine the state of the service (block 208). These performance counters are maintained as standard Windows performance counters to allow for any commercial monitoring tools that can access the Performance monitor API from MS Windows to watch for errors. The performance counters that are maintained may include, for example.

Configured Thread Count,
Actual Thread Count,
Listener Threads Created,
Listener Threads Created per Second,
Total Errors, and
Total Errors per Second.

By monitoring these values, support personnel can readily detect a problem with the system as it occurs. An example would be to poll the "Listener Threads Created" counter every 5 minutes, or other predetermined time and if it changes, then a problem occurred. Alteratively, the system of an embodiment of the invention can compare the "Actual Thread Count" to the "Configured Thread Count". If these counts do not match, the system of an embodiment of the invention will recognize that something is incorrect. Alternatively, the system can monitor the "Errors Per Second" for a non 0 value. Each listener thread can load an optional preprocessor object to process the informing message body before it is passed to BizTalk (block 208).

In one embodiment, the optional preprocessor may be an application programming interface for preprocessing messages as a set of readable objects having access to a first messaging tool. In one embodiment, the application programming interface accesses the preprocessor which allows custom processing of the MQ message received from a queue.

The preprocessor is capable of being updated and a new version loaded while the service is running. The listener configuration includes an optional .Net Assembly file to load, and a corresponding .Net object derived from a predefined class library:

```
namespace IBM.MQToBizTalk BridgeServiceAdapter
/// <summary>
/// Summary description for class1.
///<summary>
public abstract class PreProcessorAbstract:
System.MarshallByRefObject
{
public abstract sting Execute (System.Collections.Sortlist
HeaderDictionary, string MessageBody);
    public abstract void LogSubmitError (string MessageBody,
string ErrorMessage, string ErrorCode);
}
```

This interface abstract is an abstract class versus an interface so that the object can be forced to be derived from System.MarshallByRefObject, which allows calling the interface across the applications domains. In this manner, multiple versions of the code can be loaded into different domains, allowing phased roll out approaches if necessary.

By implementing a preprocessor, information from the MQ Message Envelope can be added to the message, the message could be logged to a database, decrypted, or any other processing the application needs to do is performed before the message is in BizTalk. If there is an error putting the message into BizTalk (e.g., BizTalk server down), then the error message is passed to an "LogErrorMessage" method, and any processing that the preprocessor did during the execute method can be undone.

The message is read from the MQ queue, using the "Check Point" option in MQ. This allows the listener thread to issue a rollback command to MQ which will place the message back on the queue for resubmission. This allows for robustness and recovery (block 210).

The preprocessor of an embodiment of the invention has the option to consume the message without it going to BizTalk (block 212). This is accomplished by returning a null document to the listener thread, indicating that the message is consumed and that it should not be rolled back (block 214). This function allows for the removal of invalid documents prior to the submission. Although BizTalk can also perform document validation, if the application needs to handle bad documents in a different manner than BizTalk, or needs to have the documents reformatted prior to the submission, the preprocessor of an embodiment of the invention can handle this task as described herein.

A default envelope preprocessor can be provided which wraps the original massage in an XML envelope, utilizing MQ data to determine the source and destination of the document (block 216). The application programming interface has the ability to access the default envelope preprocessor to wrap an original message in the envelope. Once the message has been preprocessed, it is submitted to BizTalk (or other type of application program) via its exposed application programming interface (block 218).

The message is then removed from the message queue (block 220). This would be implemented by adding a XML wrapper around the is message body, with a header section which includes the details from the MQ Message envelope. Example envelope properties may include message id, correlation id, put date & time, put queue manager, queue name, reply to queue manager, reply to queue, put application, userid, received time, server name, listener thread name, to name a few.

A sample configuration structure may include,

```
<BridgeConfiguration>
        <QueueManager QueueManagerName=
"QM_q1234" Channel=BRIDGE.Channel"
Connection="Server1.xxx.com (1234"/>
        <Application ApplicationName="xxxx">
            <Assembly
AssemblyName="IBM.Preprocessor1"
Location="c:\programfiles\Preprocessor\IBM.PreProcessor1.dll"
loadorder=1>
            <PreProcessor PreProcessorName=
"IBM.PreProcessor.SomePreprocessor"
AssemblyName="IBM.PreProcessor1"/>
            Listener QueueManagerName="QM-q1234"
QueueName="QUEUE.1"
PreProcessor="IBM.PreProcessor.SamePreProcessor" BizTalk
Channel="Channel to do something">
        <BridgeConfiguration>
```

Figure 3:
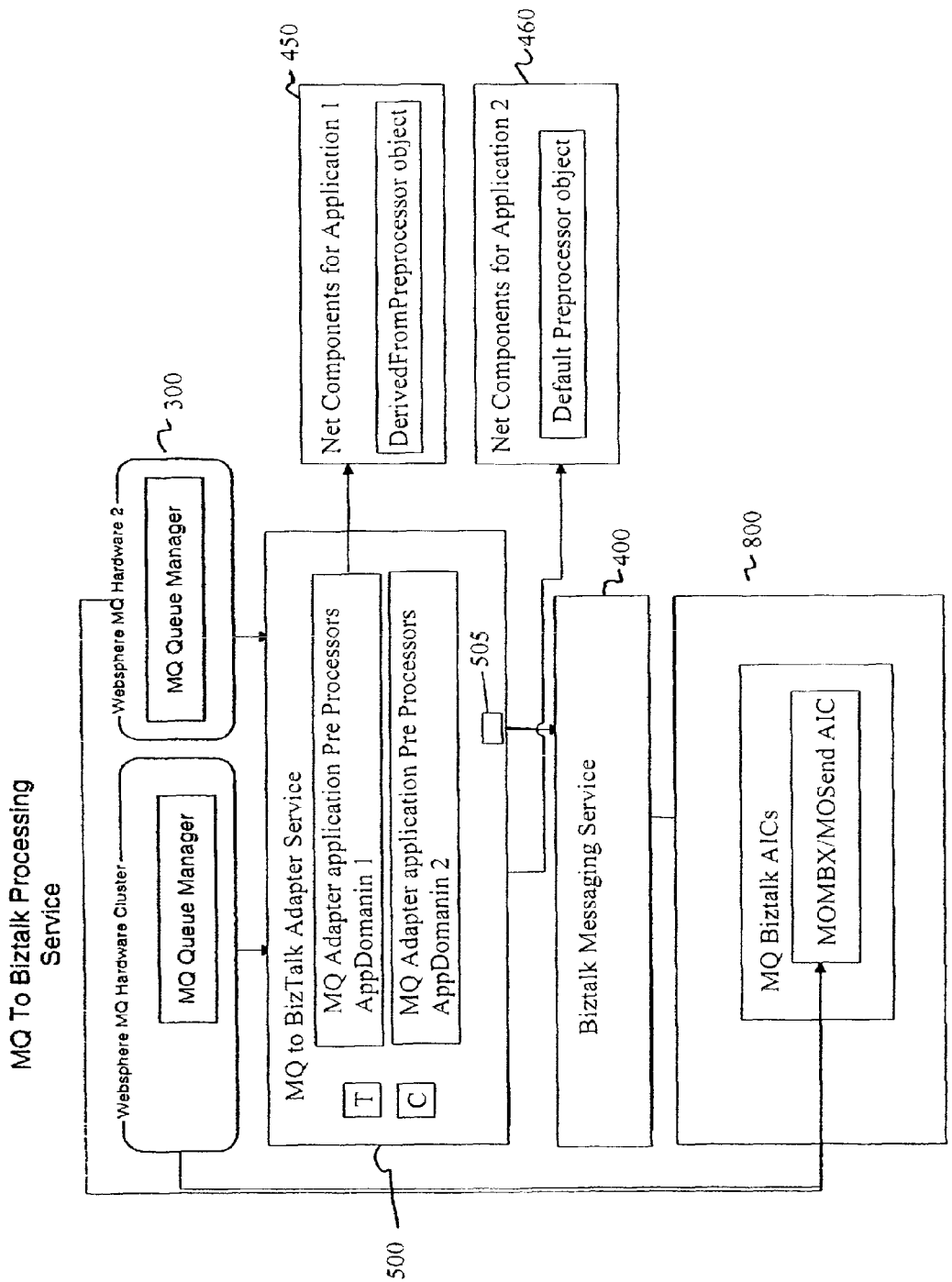
FIG. 3 is a block diagram of an implementation of the invention.

FIG. 3 is a block diagram of an implementation of an embodiment of the invention. In FIG. 3, the processing block denotes the relationship of the MQ Series server 300 and the MS BizTalk Messaging Service 400 using the system of an embodiment of the invention, e.g., "MQ To BizTalk Adapter Service" or service 500. By way of representation, the service 500 includes an application programming interface labeled "AppDomain 1" and "AppDomain 2", which represent any number of listener threads which each has its own copy and implemented preprocessors, as described above. This figure shows communication with two MQ Servers, but the invention is not limited to any specific number of MQ Servers or Queue managers on those servers.

As further shown in FIG. 3, the application programming interface has the ability to access preprocessor modules 450, which allow custom processing of an MQ message received from a queue. The preprocessor modules can be updated and a new version loaded while the service is running. In this manner, the preprocessor modules 450 allow for the service to perform any necessary preprocessing for the messages. The number of preprocessors modules is also unlimited, however there is preferably one per configured listener. The service 500 also may access the default envelope preprocessor 460.

FIG. 3 further shows a module 505 for accessing the second messaging tool interface, e.g., BizTalk Messaging Service 400. An MQ Send AIC 600, e.g., a second module, is also shown. AS discussed above, the module 505 has the ability to expose an AIC interface, and has the ability to look up destination MQ Queue manager and destination Queue information based on document type, sender id or by a predefined destination. As shown further in FIG. 3, the service 500 includes a controller "C" and timer "T", which functions are described above.

While the invention has been described in terms of embodiments, those skilled in the art will recognize that the invention can be practiced with modifications and in the spirit and scope of the appended claims.

What is claimed is:

1. A method, comprising:
    retrieving at least one message from a first messaging tool using at least one independent processing thread to retrieve message objects from a messaging queue of the first messaging tool using at least one processor of a computer infrastructure;
    executing a preprocessing on the retrieved message object using a predefined application programming interface (API) using the at least one processor of the computer infrastructure;
    setting and creating a processing thread object which represents a message queuing (MQ) listener for each configured processing thread of the at least one processing thread;
    applying a processing thread configuration setting which instructs the at least one processing thread to listen for messages on a specific queue of the first messaging tool;
    instructing the at least one processing thread to load a preprocessor in order to form any application specific processing on any messages received by the at least one processing and thread; and
    placing a preprocessed message on an API of a second messaging tool for process of the preprocessed message using the at least one processor of the computer infrastructure,
    wherein the at least one processing thread receives an instruction to direct any output from the preprocessing to a specific location on the second messaging tool.

2. The method of claim 1, wherein the retrieving step comprises utilizing independent threads to allow for parallel processing of the messages.

3. The method of claim 1, further comprising passing the at least one message through a preprocessor object using another API and placing the result of the preprocessing on the API of the second messaging tool.

4. The method of claim 1, further comprising monitoring a status of the at least one processing thread and restarting the at least one processing thread, if necessary.

5. The method of claim 4, further comprising maintaining a copy of a configuration file, which specifies each messaging queue of the first messaging tool to listen to, and an appropriate configuration setting for the each messaging queue of the first messaging tool.

6. The method of claim 1, further comprising accessing a default envelope preprocessor to wrap an original message of the at least one message in an envelope.

\* \* \* \* \*